E. MILLER.
Dumping Wagon.

No. 100,052. Patented Feb. 22, 1870.

WITNESSES.

INVENTOR.
Edmund Miller

United States Patent Office.

EDWARD MILLER, OF MILWAUKEE, WISCONSIN.

Letters Patent No. 100,052, dated February 22, 1870; antedated February 11, 1870.

IMPROVED DUMPING-WAGON.

The Schedule referred to in these Letters Patent and making part of the same.

*To all whom it may concern:*

Be it known that I, EDWARD MILLER, of the city and county of Milwaukee, and State of Wisconsin, have invented a new and useful Improvement in Dumping-Wagon; and I do hereby declare that the following is a full, clear, and exact description thereof, which will enable those skilled in the art to make and use the same, reference being had to the accompanying drawing forming part of this specification, in which—

Figure 1:
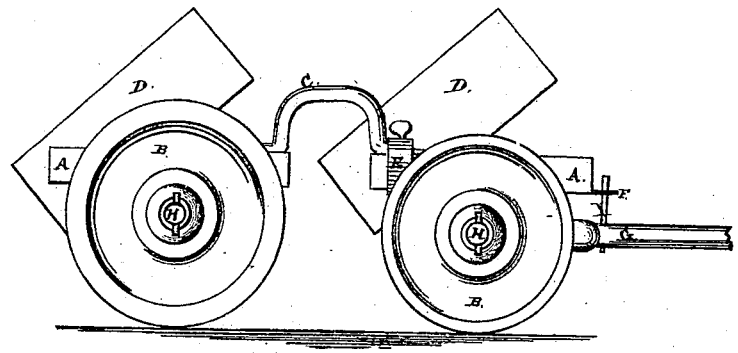

Figure 1 is a side view of my invention.

Figure 2:
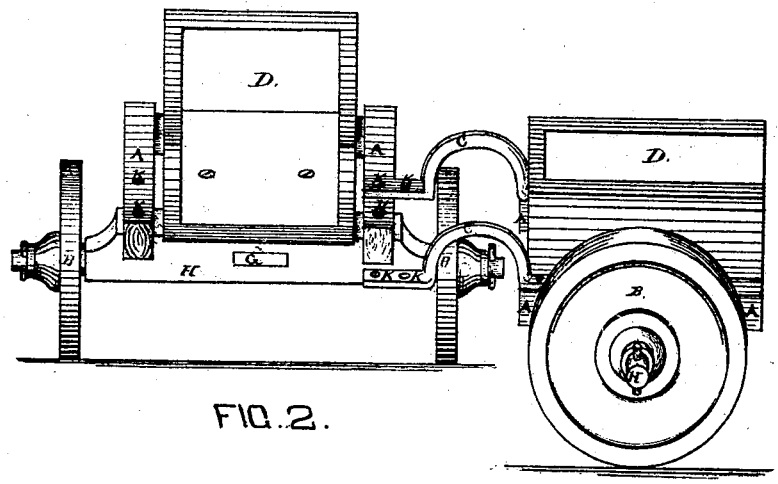

Figure 2, rear perspective view of the wagon backed up to the sidewalk to dump out the load from the forward box.

Similar letters of reference in each of the figures indicate corresponding parts.

The object of my invention is to provide a dumping-wagon that can be turned round in a short space, and that the load from the forward and rear boxes can be both dumped on the sidewalk or at any other point desired.

A is the frame-work of the wagon.

B, the wheels.

C, bowed connections in the center of the frame for the forward wheels to pass under, so that the wagon can be turned around short.

D, dumping-boxes hung in or near the center of the center, so that they can be tipped up and dump out the load.

E, movable fastenings on the ends of connections C, to be removed when the cart is to be moved around in the position, fig. 2.

F, projection on the frame A, with a hole in the end of it, so that the pin I can be taken out of the side piece C and put through this piece down into the tongue G, so as to hold the cart stiff when turning it around into the position, fig. 2.

G, tongue of the wagon.

H H, axle-trees.

I, pin, which is placed in one of the holes K, to hold the frame A together firmly when the wagon is in ordinary use, but taken out and put through the piece F, down into tongue G, when the wagon is to be backed to unload, as shown, fig. 2.

K K K K, holes in the bows C C and frame A, for pins to hold the frame A together firmly.

Operation.

The wagon is fastened together as shown, fig. 1, the bows C being fastened to the frame A, so that the frame is stiff. In this position it may be loaded and driven to whatever place required.

If the load is to be dumped without regard to particular locality, the boxes D are unhitched and the load dumped. If it is a load of coal, with a part to go to two places, the wagon is driven to the place where the first part is to be dumped, backed up, and the hind box tilted, and the load left. Then drive to the next place, take out pin I and put it in through F, which will hold the forward box stiff. Take off pieces E E, and turn the frame and back the front part of the wagon up to the place wanted, and dump the forward box. In this way the two parts of the load may be landed at different places, or both may be landed at one place.

This wagon is handy for grading on railroads, because it can be turned in a very contracted place; in fact, it can be turned in about as small a place as a two-wheeled cart. It is handy for all purposes on a farm, and everywhere where a handy conveyance is wanted.

What I claim as my invention, and desire to secure by Letters Patent, is—

A dumping-wagon constructed with frame A, pieces C C, dumping-boxes D D, wheels B B, and axles H H, substantially as described.

EDWARD MILLER.

Witnesses:
  J. B. SMITH,
  W. M. HORNOR